United States Patent [19]

Findley

[11] 4,005,390
[45] Jan. 25, 1977

[54] MERGER AND MULTIPLE TRANSLATE TABLES IN A BUFFERED PRINTER

[75] Inventor: Gerald I. Findley, Morgan Hill, Calif.

[73] Assignee: International Business Machines Corporation, Armonk, N.Y.

[22] Filed: Nov. 11, 1974

[21] Appl. No.: 522,994

[52] U.S. Cl. .................. 340/172.5; 340/324 R; 178/30; 178/15; 197/20

[51] Int. Cl.$^2$ .............. G06F 3/12; G06F 7/32; G06F 13/00

[58] Field of Search .......... 178/4, 6, 7, 15, 25, 178/30; 331/94.5 K, 94.5 M; 332/7.51; 340/146.3 AH, 146.3 D, 146.3 MA, 172.5, 173 LM, 324 A, 324 AD, 324 M, 324 R; 346/76 L; 359/5, 7, 8, 9; 445/1; 101/13, 93; 197/16, 19, 20, 133 R

[56] References Cited

UNITED STATES PATENTS

| | | | |
|---|---|---|---|
| 3,394,350 | 7/1968 | Packard | 340/172.5 |
| 3,419,322 | 12/1968 | Adler | 350/161 |
| 3,506,779 | 4/1970 | Brown et al. | 178/15 |
| 3,586,120 | 6/1971 | Adler | 181/.5 |
| 3,622,701 | 11/1971 | Gardner | 178/30 |
| 3,624,607 | 11/1971 | Mita et al. | 340/146.3 AH |
| 3,634,828 | 1/1972 | Myers et al. | 340/172.5 |
| 3,688,033 | 8/1972 | Hell et al. | 178/15 |
| 3,696,387 | 10/1972 | Nussbaum | 340/324 A |
| 3,701,972 | 10/1972 | Berkeley et al. | 340/172.5 |
| 3,725,900 | 4/1973 | Ohmann et al. | 340/324 A |
| 3,750,189 | 7/1973 | Fleischer | 346/74 ES |
| 3,760,376 | 9/1973 | Tanner | 340/172.5 |
| 3,768,091 | 10/1973 | Naka | 178/30 X |
| 3,786,429 | 1/1974 | Goldman et al. | 340/324 A |
| 3,803,629 | 4/1974 | Walsh et al. | 178/30 X |
| 3,815,094 | 6/1974 | Smith | 340/172.5 |
| 3,815,104 | 6/1974 | Goldman | 340/172.5 |
| 3,848,232 | 11/1974 | Leibler et al. | 340/172.5 |
| 3,872,462 | 3/1975 | Lemelson | 340/324 A |
| 3,883,728 | 5/1975 | Schwartz et al. | 340/324 R |
| 3,886,526 | 5/1975 | Smith | 340/324 A |
| 3,893,075 | 7/1975 | Orban et al. | 340/324 AD |
| 3,895,374 | 7/1975 | Williams | 340/324 AD |

*Primary Examiner*—Gareth D. Shaw
*Assistant Examiner*—Jan E. Rhoads
*Attorney, Agent, or Firm*—Fraser and Bogucki

[57] ABSTRACT

In a buffered printer in which lines of character code bytes representing characters to be printed are translated into lines of graphic code bytes by a translate table, assembled into a page format in a page buffer and applied to a character generator module to select sets of character image bits in storage locations within the module corresponding to the graphic code bytes, the selected sets of character image bits being applied to modulate a scanning laser beam to effect printing of the desired characters, each line of graphic code bytes provided by the translate table is entered into the page buffer in a selected location determined by a channel command associated with the previously entered line. Each "write and no space" command accompanying a line of graphic code bytes stored in the page buffer results in the immediately following line of graphic code bytes being stored in the same location. The two different lines are combined in accordance with a merge algorithm. A "write and space one line" command accompanying a line of graphic code bytes stored in the page buffer results in the next line of graphic code bytes being stored in the next line of graphic code bytes being stored in the next available storage location within the page buffer. The lines of graphic code bytes as so assembled in the page buffer are thereafter applied, one line at a time, to the character generator module to effect printing of the various characters represented by the graphic code bytes. The printing arrangement may be provided with plural translate tables to provide for printing of different characters in the same line using the same character code byte. Two or more lines, each containing the same character code byte, are directed by the associated channel commands into different ones of the translate tables for conversion of the character code byte into different graphic code bytes in the two resulting lines of graphic code bytes. The two lines of graphic code bytes are merged into a single line in the page buffer, following which the two different graphic code bytes are applied to the character generator module to effect printing of the two different characters represented thereby.

19 Claims, 7 Drawing Figures

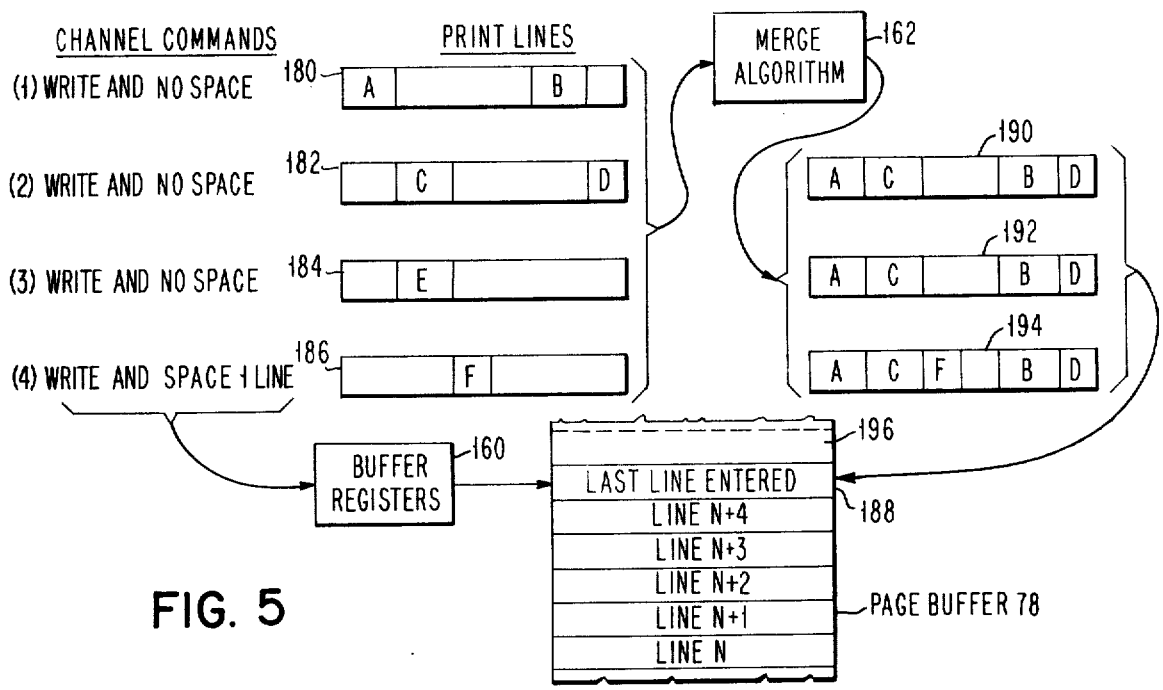
FIG. 5
FIG. 6
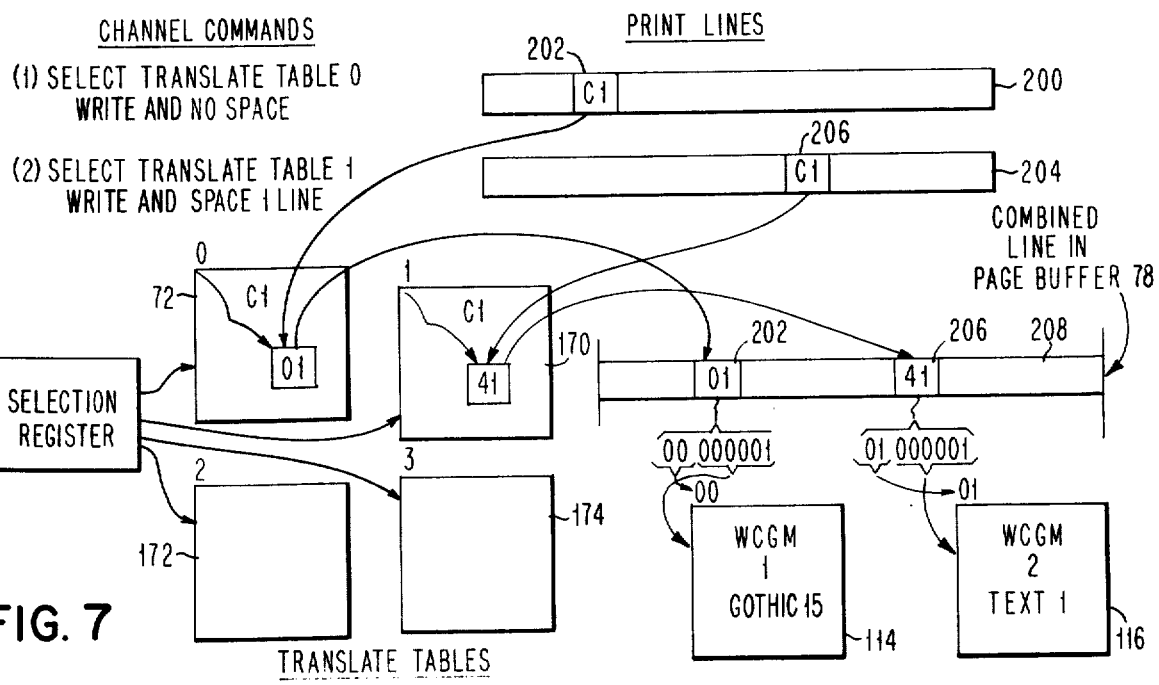
FIG. 7

MERGER AND MULTIPLE TRANSLATE TABLES IN A BUFFERED PRINTER

BACKGROUND OF THE INVENTION

1. Field of the Invention

The present invention relates to printers of the type which print characters in response to coded digital data, and more particularly to arrangements within such printers for combining lines of the coded digital data into a single line and for translating the different lines of coded ditital data into corresponding graphic code data in accordance with different translation algorithms provided by different translate tables.

2. History of the Prior Art

Printers of the type which print graphic characters in response to coded character data in binary form have found widespread use in many data processing operations and systems. Such printers respond to the incoming coded character data to physically print the graphic characters represented by the character data as defined by the code itself. The printing operation can assume various different forms including the well known impact printer in which each segment of the coded character data results in the selection of a piece of type or other raised indicia. The selected piece of type strikes a piece of paper or other printable medium to effect printing of the desired graphic character.

Prior art printers of the type described suffer from a number of disadvantages which often limit their usefulness. One limitation of such printers relates to the fact that the various print lines as received by the printer cannot be combined so as to take advantage of the various processes to which the coded data is subjected. A further limitation of such prior printers relates to the inability to provide certain flexibility in the processing of data within the printer so as to provide for such things as the printing of different graphic characters in the same line using the same character code data.

BRIEF DESCRIPTION OF THE INVENTION

The present invention provides for the combining of print lines within the printer as well as the use of the same character code data to effect printing of different characters in the same line. Line merger in accordance with the invention is accomplished by channel commands associated with the incoming lines of character code data, the channel command for each incoming line specifying whether the next incoming line is to be entered in the same storage space in a page buffer as the present line or entered in the next available storage space. A merge algorithm is used to combine each translated line with the previously stored line when the incoming line is directed to the previous storage location. Thereafter the system responds to the various segments of graphic coded data in the combined line to effect printing of the line as a single line on a printable medium.

Use of the same character code data to print different characters is accomplished by plural translate tables, each of which translates the incoming character code data in accordance with an algorithm different from that of the other translate tables. Thus the same character code data occurring in two different incoming lines translated by two different translate tables appears as different graphic code data in the resulting lines of graphic code data which are thereafter merged into one line in the page buffer. The two different segments of graphic code data are thereafter applied to print different characters as the line is printed.

BRIEF DESCRIPTION OF THE DRAWINGS

The foregoing and other objects, features and advantages of the invention will be apparent from the following more particular description of preferred embodiments of the invention, as illustrated in the accompanying drawings, in which:

FIG. 5 is a block diagram of a portion of the arrangement shown in FIG. 3 together with graphical illustrations of the manner in which print lines are selectively merged in accordance with the invention;

FIG. 6 is a table comprising the merge algorithm used in the arrangement of FIG. 5; and FIG. 7 is a block diagram of a portion of the arrangement shown in FIG. 3 together with graphical illustrations of the manner in which plural translate tables and line merger are employed to print different graphic characters in the same line in response to the same character code but in accordance with the invention.

DETAILED DESCRIPTION

Figure 1:
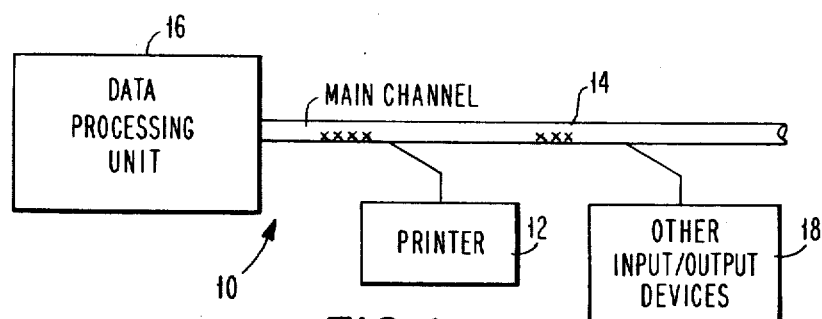
FIG. 1 is a basic block diagram showing the manner in which printers according to the invention are coupled to a data processing unit via a main channel.

FIG. 1 illustrates a data processing system 10 which incudes a printer 12 in accordance with the invention coupled to a main channel 14 of a data processing unit or computer 16. The printer 12 comprises an input/output device, and the main channel 14 may be and is typically coupled to other input/output devices illustrated as 18 in FIG. 1.

The general operation of the data processing system 10 in conjunction with the printer 12 is described in detail in a co-pending application, Ser. No. 522,998, Gerald I. Findley, PRINTER. As described in that application the data processing unit 16 which typically includes a central processing unit and a main store communicates with the printer 12 and the other input-/output devices 18 via the main channel 14. Character code bytes, each of which represents a different character to be printed by the printer 12, are originated in the data processing unit 16 and are communicated to the printer 12 as part of a channel command word sent to the main channel 14. Other channel command words originating in the data processing unit 16 include certain operating constants used in the printer 12 and certain instructions for the operation of the printer 12.

Figure 2:
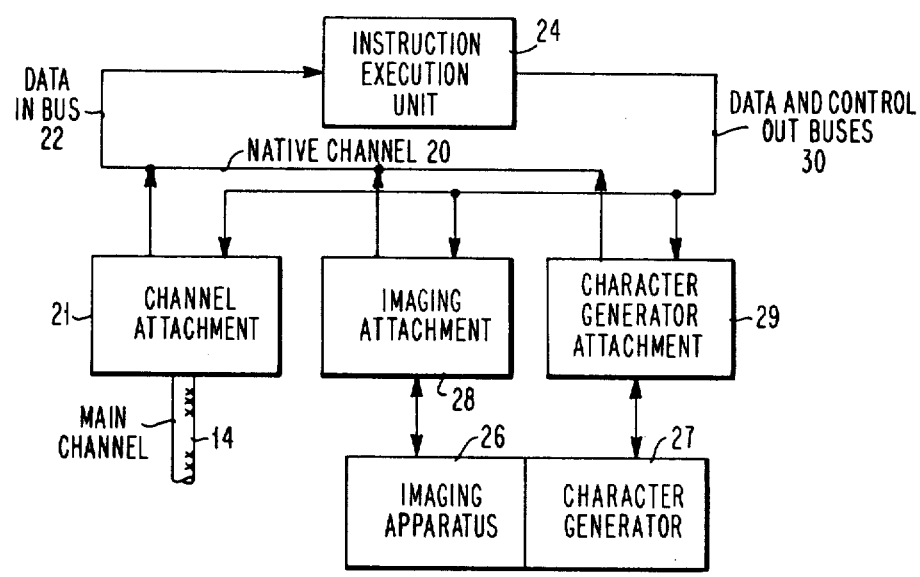
FIG. 2 is a block diagram of the basic components comprising the printer shown in FIG. 1.

FIG. 2 shows the basic arrangement of the printer 12 of FIG. 1 according to the invention. The printer 12 includes a native channel 20 coupled to the main channel 14 via a channel attachment 21 and providing appropriate interface between the main channel 14 and the printer 12. Data from the data processing unit 16 is communicated over the main channel 14 to the channel attachment 21 where it is carried by a data in bus 22 within the native channel 20 to an instruction execution unit (IEU) 24. The data in bus 22 also provides data to the instruction execution unit 24 from imaging apparatus 26 and a character generator 27. the imaging apparatus 26 is coupled to the native channel 20 via an imaging attachment 28, and the character generator 27 coupled to the native channel 20 via a character generator attachment 29. Data at the output of the instruction execution unit 24 is carried by data and control out buses 30 to the character generator 27, the imaging apparatus 26 and the native channel 20.

The instruction execution unit 24 stores the data from the data processing unit 16 and executes the instructions provided by the various microroutines of microprograms loaded by the printer's use from a flexible disk storage. The microprograms define eight prioritized levels, during the last of which various commands from the main channel 14 are executed. Execution of the various microroutines initiates operation of the imaging apparatus 26, processes the data to be printed into an appropriate form for communication to the character generator 27, operates the character generator 27 to provide sets of character image bits corresponding to characters to be printed to the imaging apparatus 26, and operates the imaging apparatus 26 to effect printing of the desired characters.

The operation of the various components of the printer 12 shown in FIG. 2 is described in detail in the previously referred to co-pending application, Ser. No. 522,998.

Figure 3:
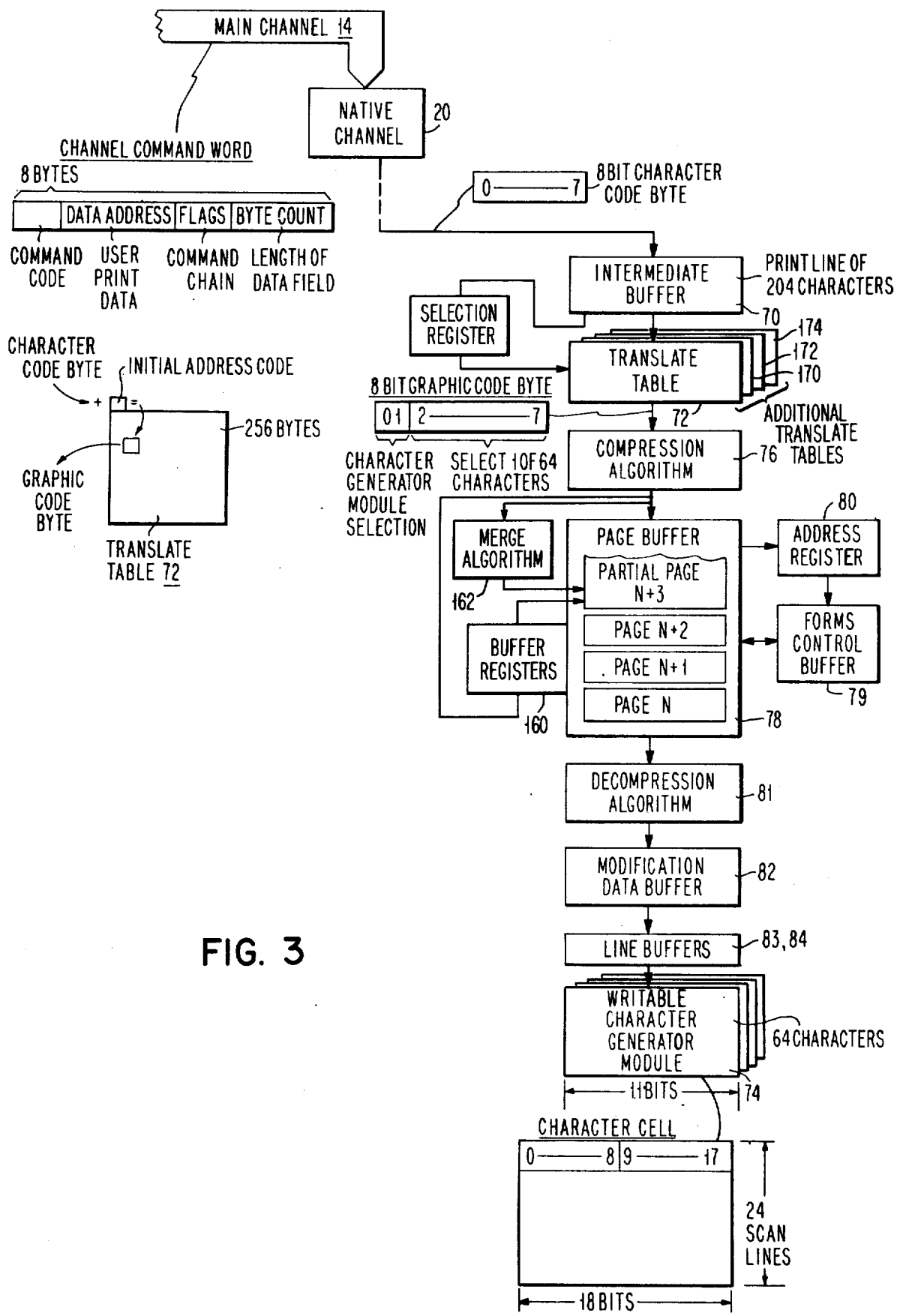
FIG. 3 is a block diagram illustrating a portion of the printer of FIG. 1 in detail.

Selected portions of the instruction execution unit 24 and the character generator 27 are illustrated in FIG. 3. The instruction execution unit 24 includes a writable control storage area providing for most of the various components shown in FIG. 3. The various components are set up within the writable control storage area using data and instructions communicated over the main channel 14 from the data processing unit 16.

Data representing characters to be printed is communicated by the data processing unit 16 and initially stored in the instruction execution unit 24 in the form of a succession of 8 bit character code bytes, with each byte representing a character to be printed. As illustrated in FIG. 3 the 8 bit character code bytes which comprise the user print data portion of channel command words originated in the data processing unit 16 and communicated into the main channel 14 are directed via the native channel 20 to an intermediate buffer 70. The channel command word also includes a command code which the printer 12 is to execute, flags which control execution of the channel command word by the main channel 14 and a length of data field which indicates the number of characters in the print line which is comprised of the various 8 bit character code bytes in the user print data and which is communicated to the intermediate buffer 70.

Up to 204 of the character code bytes are assembled in the intermediate buffer 70 to form a print line. 204 characters represents the maximum width of a print line for paper of given width in the imaging apparatus 26. The 8 bit character codes employ a hexidecimal representation to compact the data and are encoded using the well-known EBCDIC code. The EBCDIC coding of the bytes defines the characters which the various bytes represent. The various code bytes stored in the intermediate buffer 70 are supplied to a translate table 72 where they are translated, one-by-one, into corresponding graphic code bytes using the predetermined code or algorithm of the translate table 72. The predetermined code or algorithm of the translate table 72 is implemented by adding each character code byte to an additional address for the table 72 and using the resulting sum as an address for the corresponding graphic code byte stored within one of the various storage locations in the translate table 72. The translate table 72 is capable of storing up to 256 graphic code bytes, and has a position for all possible character codes that can come from the data processing unit 16. An example of the manner in which the translate table 72 may be set up is provided at page 57 of *IBM System/360 Principles of Operation*, Form A22-6821-6, Jan. 13, 1967, published by International Business Machines Corporation. Each of the graphic code bytes comprises the address of a set of character image bits stored within one of four different writable character generator modules 74 in the character generator 27. As shown in FIG. 3 each 8 bit graphic code byte from the translate table 72 comprises a first two bit field identifying a particular one of the four different writable character generator modules 74 and a second six bit field identifying 1 of 64 different storage locations within the selected writable character generator module. The selection of a storage location within one of the writable character generator modules 74 by a graphic code byte results in a set of character image bits stored in the particular location being used by the imaging apparatus 26 to print a character.

The graphic code bytes from the translate table 72 are next compressed in length using a compression algorithm 76 as they are entered into a page buffer 78 for storage therein. As previously mentioned each line may comprise as many as 204 characters. Since a page can have as many as 80 lines thereon for 11 inch paper, a page can comprise as many as 16,320 bytes. Since the purpose of the page buffer 78 is to assemble the translated data into one or more pages, the page buffer 78 would have to have a minimum capacity of 16,320 bytes per page in the absence of compression. By using the compression algorithm 76 however the graphic code bytes for an average page are sufficiently reduced in number so that an equivalent of only about 2000 bytes is required in the way of storage space for each page in the page buffer 78.

In the present example compression is performed whenever a succession of identical characters occurs which has more than a predetermined number of the characters in it. The resulting information stored in the page buffer 78 consists of a first byte which identifies the presence of a compression, a second byte which indicates the number of characters being compressed, and a third byte which is the character being compressed. An example of a compression technique which may be used is provided in IBM Technical Disclosure Bulletin Vol. 16, No. 8, Jan. 1974, DATA COMPRESSION TECHNIQUE FOR THE ELIMINATION OF REPEATING BYTE STRINGS, M. Ojalvo.

The page buffer 78 continues to assemble the compressed graphic code bytes into pages until filled. While the page buffer 78 is only required to store at least one complete page, it is typically provided with enough storage capacity to store several pages as shown in FIG. 3.

The channel command words from the data processing unit 16 include certain modifier bits which control the vertical format of each page in terms of the space between lines and the height of the characters in each line. These functions are provided by a forms control buffer 79 in conjunction with an associated address register 80. The operation of the forms control buffer 79 and the address register 80 is described in a co-pending application, Ser. No. 522,995, Gerald I. Findley and Teddy L. Anderson, INTERMIXED LINE HEIGHTS AND BLANK LINE FORMATION IN A BUFFERED PRINTER. As described in that application a different forms control byte is stored in the forms control buffer 79 for each line entered in the page buffer 78. The address register 80 identifies the various forms control bytes. One bit of each forms control byte defines the height of a corresponding line and is applied in the character generator 27 to select the number of scan lines used when the line is printed. Other bits in each forms control byte define a channel member. A channel command word defines blank lines to be inserted in a page by specifying the lines to be spaced or the channel number to be skipped to. Each time the address register 80 is incremented in spacing or skipping to the sought channel number within the forms control buffer 79 a special code is entered in the page buffer 78. When the page is being printed by the character generator 27, each of the special codes causes the character generator 27 to inhibit any modular output so that a blank line results in the printed page.

The compressed graphic code bytes assembled into pages in the page buffer 78 are decompressed upon leaving the page buffer 78 by a decompression algorithm 81 which is the reverse of the compression algorithm 76 prior to being passed together with data from a modification data buffer 82 to one of a pair of line buffers 83, 84 within the character generator 27. The decompression algorithm 81 restores each graphic code byte to the original form that it assumes at the output of the translate table 72. The modification data buffer 82 stores data used in making minor changes between copies when plural copies of the same page are to be printed. This avoids the necessity of assembling a complete page in the page buffer 78 for each page which differs only in minor respects from a previously printed copy.

The imaging apparatus 26 of the present example modulates a laser beam as the beam is scanned in raster fashion over a character space to print each character. Each character space is defined by a character cell having a height defined by 24 scans of the laser beam and a width defined by 18 bits representing the number of times the beam can be modulated during each scan of the character cell. Each set of character image bits stored in one of the writable character generator modules 74 comprises as many as 432 bits defining the 18 horizontal bit spaces for each of the 24 different scans of the laser beam. Accordingly, the character image bits define those portions of the grid pattern or matrix comprising the character cell which the particular character to be printed comprises.

Figure 4:
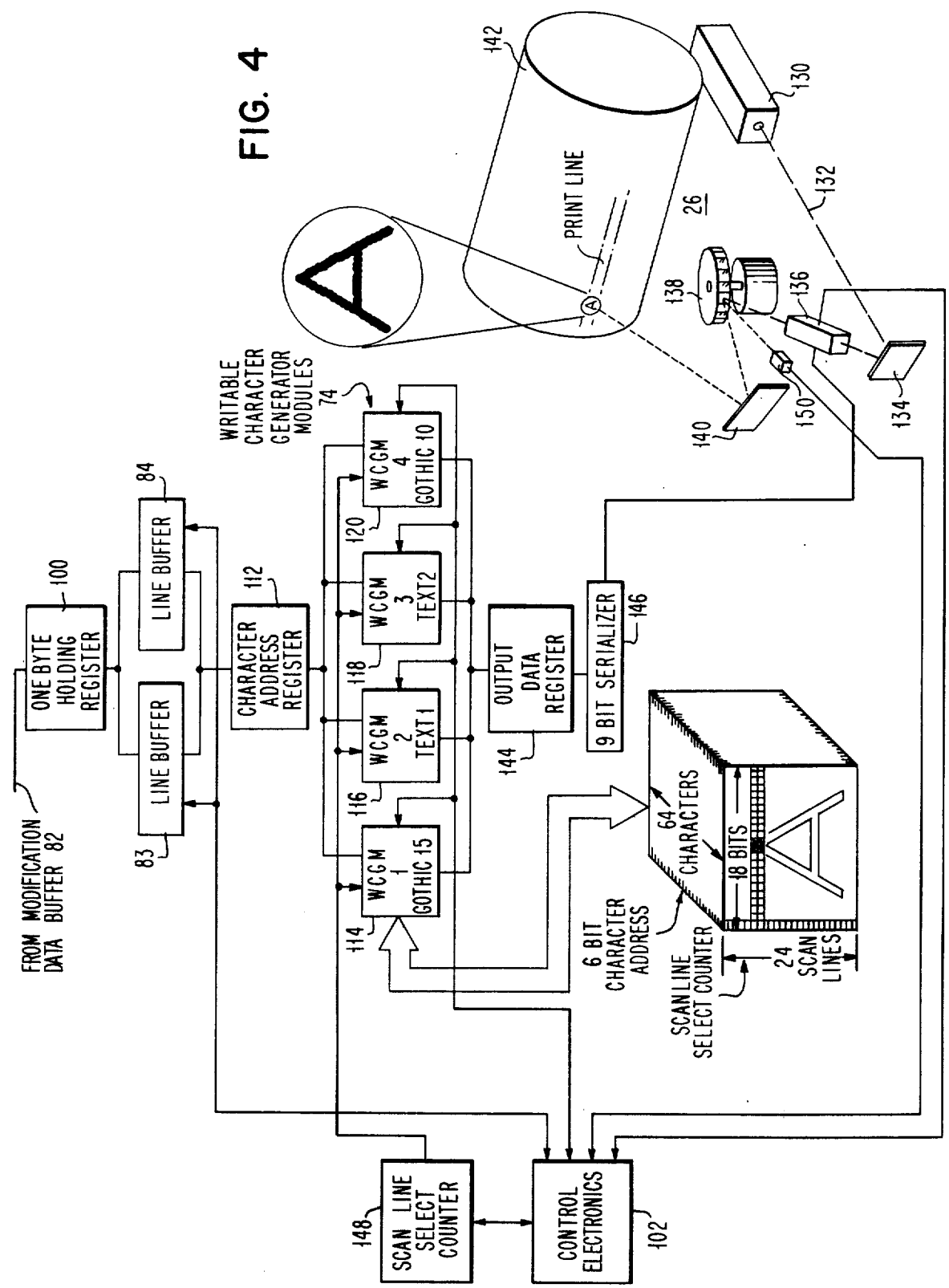
FIG. 4 is a block diagram illustrating another portion of the printer of FIG. 1 in detail.

The character generator 27 is shown in FIG. 4 together with a portion of the imaging apparatus 26. The graphic code bytes at the output of the modification data buffer 82 within the instruction execution unit 24 are fed via the native channel 20 to the character generator 27 where they are received by a 1 byte holding register 100 at the inputs of the line buffers 83 and 84. The loading and unloading of the line buffers 83 and 84 is controlled by control electronics 102. The control electronics 102 responds to control data fed from the native channel 20 to cause the contents of one of the line buffers 83, 84 to be passed to the writable character generator module 74 for printing while the other line buffer is being loaded from the one byte holding register 100, and vice versa. Accordingly the line buffers 83 and 84 alternately load and print.

The four different character generator modules 74 comprise modules 114, 116, 118 and 120. The first module 114 is loaded with Gothic 15 pitch characters, the second module 116 is loaded with characters conforming to a text 1, the third module 118 is loaded with characters conforming to a text 2 and the fourth module 120 is loaded with Gothic 10 pitch characters. Each of the modules 114, 116, 118 and 120 is capable of storing up to 64 characters. The contents of the first character generator module 114 are graphically illustrated in FIG. 4 in terms of the 24 scans of 18 bits each comprising each of the 64 characters. Two of the 18 bit scan lines are shown for the top portion of the character "A". As previously described the bits within the module 114 modulate a laser beam to produce the desired character.

The imaging apparatus 26 includes a laser 130 for providing an energy beam in the form of a laser beam 132. The laser 130 may comprise a low power Helium neo laser as shown, for example, in U.S. Pat. No. 3,750,189. The laser beam 132 is relfected by a mirror 134, which may comprise a reflective surface of the type shown in U.S. Pat. No. 3,750,189, through modulator 136 and onto a rotating mirror 138. The modulator 136 may comprise an acousto-optic modulator of the type shown in U.S. Pat. Nos. 3,419,322 and 3,586,120. The rotating mirror 138, which may comprise a series of reflective facets on a metal block as shown, for example in U.S. Pat. No. 3,750,189, has a plurality of small mirrors spaced about the periphery thereof so as to reflect the laser beam from the modulator 136 into a mirror 140. The mirror 140 reflects the modulated laser beam onto a rotating print drum 142. The rotating mirror 138 rotates at a selected speed to provide a rapid succession of scans of the modulated laser beam across the print drum 142.

The modulator 136 causes the laser beam 132 to be modulated by bits from the character generator modules 74 applied via an output data register 144 and a nine bit serializer 146. Examples of circuits which can be used as the nine bit serializer 146 are shown on page 9–124 of the First Edition of *The Integrated Circuits Catalog For Design Engineers*, published by Texas Instruments Incorporated. Timing of the character generator module 74 is controlled by a scan line select counter 148 which is initialized to the first scan line at the start of each print line. The scan line select counter 148 operates in response to scan sync signals from a scan start detector 150 to synchronize the outputting of bits from the character generator module 74 with the rotation of the mirror 138. The scan start detector 150, which comprises a sensing device responsive to light of laser wavelength such as a photocell, a phototransistor or a photodiode of the type shown, for example, in U.S. Pat. No. 3,750,189, generates a signal in response to each facet of the rotating mirror 138 and therefore signals the beginning of each scan. As each scan is begun circuitry within the control electronics 102 signals the scan line select counter 148 to pick a particular scan of a graphic in one of the writable character generator modules 74 and to begin feeding bits from one of the character generator modules 74 to the output data register 144. Circuitry within the control electronics 102 keeps a count of the various character positions in the line buffers 83, 84. At the beginning of each scan as determined by the scan line select counter 148, the character address register 112 causes selection of the appropriate bits from the writable character generator modules 74 under the control of counting circuitry within the control electronics 102. The control electronics 102 responds to the scan sync signal at the start of each scan to turn on the modulator 136 and the laser 130 for the next scan start.

As printing is begun the 18 bits comprising the first scan of the first character which are temporarily stored in the output of data register 144 are advanced to the 9 bit serializer 146 where each of the bits is serially fed to the modulator 136 to modulate the laser beam 132 as it scans across the first character. At this point the first scan of the second character on the line is begun by transferring the 18 bits of the scan via the output of data register 144 and the 9 bit serializer 146 to modulate the laser beam. The system continues in this fashion until the laser beam has completed the first scan of each of the characters in the line, at which point the scan line select counter 148 is incremented and the next scan of the laser beam begins and is sensed by the scan start detect 150. The resulting scan sync signal from the scan start detector 150 causes the outputting of the data bits for the second scan of the first character to the output data register 144 and the 9 bit serializer 146 to print the second scan of the first character. The bits comprising the second scan for each succeeding character are used to modulate the laser beam until the second scan of the entire print line is completed. The system continues in this fashion until the laser beam has made 24 scans of the print line and all characters on the line have been printed. Thereafter the process is repeated for each succeeding print line.

As described in detail in the previously mentioned co-pending application, Ser. No. 522,998, the imaging apparatus 26 employs known electrophotographic techniques to develop the discharged areas on the surface of the drum 142 which result from the modulated laser beam 132. The drum 142 is rotated past a developer where the surface is coated with a toner which adheres to the discharged areas of the surface. The toner is transferred onto a paper which comes into contact with the drum surface, and the paper as so printed with the toner is advanced through a fuser to a continuous forms stacker.

In accordance with the invention the print lines can be communicated to the printer 12 via the main channel 14 together with a channel command specifying either a "write and no space" function or a "write and space one line" function. As described in connection with FIG. 3 each print line communicated via the main channel 14 and temporarily stored in the immediate buffer 70 is translated by the translate table 72 and compressed by the compression algorithm 76 prior to being entered in the page buffer 78. Buffer registers 160 which are shown in FIG. 3 and which are associated with the page buffer 78 point to a selected line space in the page buffer where the incoming line is to be stored.

When a line is communicated by the main channel 14 to the printer 12 together with a write and no space command the line is entered in the selected line space in the page buffer 78. the buffer registers 160 respond to the write and no space command by continuing to identify the selected line space and thereby causing the immmediately following line from the compression algorithm 76 to be entered in the same space. A merge algorithm 162 controls the merging of each incoming line with a previously stored line in accordance with a system of priorities. Thus where one line has a graphic code byte in a particular location and the other line has a blank space in the same location, the graphic code byte is stored in that location. In the event a graphic code byte appears in the same location in the two different lines, the byte of the previously entered line takes precedence and an error signal is generated if the two bytes are not the same. The merge algorithm 162 can comprise any appropriate circuitry such as AND gates and INVERTORS for indicating in complementary fashion the presence of a blank space in either of the lines being merged and further AND gates responsive to the complementary indications for determining priority. The last line in a plurality of lines to be merged within the page buffer 78 is communicated together with a write and space one line channel command. Upon merging of the incoming line with the line stored in the selected line space, the buffer registers 160 are incremented so as to point to the next available line space in preparation for the next incoming line, thereby causing the line formed by merger of two or more of the prior lines to advance through the page buffer 78 for eventual printing.

The operation of the buffer registers 160 and the merge algorithm 162 to cause line merger is described in detail hereafter in connection with FIGS. 5 and 6.

The operation of the arrangement shown in FIG. 3 was previously described in conjunction with the single translate table 72. In accordance with the invention, however, the storage area defining the translate table 72 can be initially loaded so as to provide three translate tables 170, 172 and 174 in addition to the translate table 72. The graphic code bytes stored in the translate table 72 are also stored in the tables 170, 172 and 174 but point to other ones of the writable character generator modules 74. This enables each of the four translate tables to translate in accordance with a predetermined algorithm different from the algorithms of the other three tables. This arrangement enables different graphic characters represented by the same graphic code byte to be printed in the same line. As described hereafter in conjunction with FIG. 7 the character code byte appears in different incoming lines which are directed to different ones of the translate tables 72, 170, 172 and 174. The character code byte appears as two different graphic code bytes as the different lines are translated and eventually merged into a single line in the page buffer 78 using the buffer registers 160 and the merge algorithm 162. The writable character generator modules 74 respond to the two different graphic code bytes in the combined line to cause printing of two different characters in the line.

FIG. 5 provides an example of line merger in accordance with the invention in which four different lines 180, 182, 184 and 186 are to be merged into a single line. The line 180 has graphic code bytes in the areas A and B, the remainder of the line 180 being blank. The line 182 has graphic code bytes in the areas C and D. The line 184 has graphic code bytes in the area E, while the line 186 has graphic code bytes in the area F.

The first line 180 is entered into a line space 188 within the page buffer 78, the line space 188 being the selected line space as determined by the buffer registers 160. Since the first line 180 is accompanied by a write and no space channel command, the buffer registers 160 continue pointing to the line space 188 so as to identify such space as the selected space. The immediately following line 182 is therefore entered in the line space 188 where it is merged with the first line 180 in accordance with the merge algorithm 162 to form a combined line 190. Merger is performed in accordance with the merge algorithm shown in FIG. 6, and the resulting combined line 190 includes the graphic code byte areas A, C, B and D as well as the intermediate blank space. Since the second line 182 is accompanied by a write and no space channel command, the buffer registers 160 continue pointing to the line space 188. Therefore the third line 184 is entered in the line space 188 where it is merged with the line 190 to provide the combined line 192. Since the lines 190 and 184 contain graphic code bytes C and E in the same area thereof, the merge algorithm chooses the graphic code bytes of the previously stored line 190 and signals an error. Accordingly the combined line 192 is the same as the line 190. Again the line 184 has been communicated with a write and no space channel command, causing the buffer registers 160 to continue to point to the line space 188. Therefore, the fourth line 186 is entered in the line space 188 where it is merged with the combined line 192 to produce the combined line 194. The line 192 is modified by the addition of the graphic code bytes F, leaving a small blank space between such bytes and the following group of bytes B. The fourth line 186 was accompanied by a write and space one line channel command causing the buffer registers 160 to advance to the next line space 196 in the page buffer 78.

With the buffer registers 160 pointing to the line space 196 the line 194 becomes line "N + 5" and is advanced through the page buffer 78 successively with the other lines previously stored in the page buffer, and is eventually entered in one of the line buffers 83 and 84 where it is printed as a single line.

The system continues to operate in the manner described. Each line accompanied by a write and no space channel command causes the buffer registers 160 to continue pointing at the same line space so that the immediately following line is merged therewith. Each write and space one line channel command causes the buffer registers 160 to point to the next available line space for storage of the immediately following line.

The manner in which the same character code byte is used to print different graphic characters in the same line is illustrated by the example of FIG. 7. In the example of FIG. 7 a first print line 200 having the character code byte C1 in a first storage location 202 is communicated with "select translate table 0" and write and no space channel commands. This causes the print line 200 to be directed to translate table 0 which is the first translate table 72 for translation. A second print line 204 has the same character code byte C1 in a second location 206 thereof different from the first location 202 within the line 200. The line 204 is communicated with "select translate table 1" and write and space one line channel commands. This causes the line 204 to be applied to translate table 1 or the second translate table 170 for translation. In the case of each line 200 and 204 the various character code bytes thereof are added to the addresses of the translate tables 72 and 170 respectively to identify the desired storage locations therein. While the selected storage locations are the same, the graphic code bytes stored therein are different in accordance with the different algorithms of the translate tables 72, 170, 172 and 174. Accordingly the character code byte C1 in the first line 200 results in the selection of a location within the translate table 72 containing the graphic code byte 01. On the other hand the same character code byte C1 within the second line 204 results in selection of a storage location within the translate table 170 containing the graphic code byte 41.

Since the first line 200 is communicated in conjunction with a write and no space channel command, the resulting translated line is stored in a line space within the page buffer 78 and the buffer registers 160 continue pointing to the same space. This results in the second line 204 as translated being entered in the same space and merged with the first line as translated to provide a combined line 208 in which the graphic code bytes 01 and 41 appear in the first and second locations 202 and 206 respectively.

As previously noted each graphic code byte identifies a particular one of the writable character generator modules 74 and a particular storage location therein. In the present example the graphic code byte 01 includes the binary digits 00 identifying the writable character generator module 114 and the binary digits 000001 identifying a particular storage location within the module 114. The graphic code byte 41 contains the binary digits 01 identifying the second writable character generator module 116, and the binary digits 000001 identifying a particular storage location within the module 116.

The selected storage locations can be any of the available locations within the various writable character generator modules. In the present example the storage locations identified by the binary digits 000001 happen to be the same in both of the modules 114 and 116 since the character code byte C1 is being used to print the same character but in a different type style. Specifically the selected group of character image bits in the writable character generator module 114 results in the printing of a Gothic A of 15 pitch while the group of character image bits chosen in the module 116 results in printing of an A in text 1. It should be understood, of course, that the same character code byte can be used to print different characters of the same type style within a given line by appropriate loading of the translate tables and the writable character generator modules. For example the same character code byte could be used to print a Gothic A of 15 pitch from the module 114 and Gothic M of 15 pitch from the module 114.

The arrangement of FIG. 7 solves the problem which frequently arises in connection with printing systems of this type where several characters in a line to be printed are represented by the same character code byte. Since in the present example four different translate tables 72, 170, 172 and 174 are provided, up to four different characters in a line can be represented by the same character code.

While the invention has been particularly shown and described with reference to preferred embodiments thereof it will be understood by those skilled in the art that various changes in form and details may be made therein without departing from the spirit and scope of the invention.

What is claimed is:

1. An arrangement for printing lines of characters in response to sequentially occurring lines of coded data, each line of coded data including a command, comprising:
   data storage means having a plurality of storage locations therein, each storage location being capable of storing a line of coded data;

selecting means for selecting a particular one of the storage locations of the data storage means to receive the sequentially occurring lines of coded data, the selecting means being responsive to the commands of the sequentially occurring lines of coded data to continue to select the previously selected storage location in response to a first type of command and to advance to and select the next storage location in response to a second type of command from the first type;

means responsive to each of the sequentially occurring lines of coded data for merging the line of coded data with any line of coded data already in the storage location selected by the selecting means in accordance with a predetermined algorithm, said means for merging including means for comparing portions of the line of coded data with portions of any line of coded data already in the storage location and means responsive to the means for comparing for recording selected ones of the compared portions in accordance with the results of the comparison; and means responsive to the lines of coded data in the storage locations of the data storage means for printing characters represented by the coded data in each line.

2. The invention defined in claim 1, wherein the data storage means comprises a buffer and the selecting means comprises registers associated with the buffer.

3. the invention defined in claim 1, wherein the sequentially occurring lines of coded data are provided by a data processing system having a channel coupled to the arrangement for printing, the commands comprising channel commands communicated via such channel.

4. The invention defined in claim 1, wherein the predetermined algorithm causes the means for merging to merge a line of coded data with any line of coded data already in the storage location by recording in the storage location a character in either the incoming line or the line already in the storage location when a corresponding character space in the other line is blank, by recording in the storage location a character in the line already in the storage location when a corresponding character space in the incoming line has a character in it, and by recording in the storage location a blank in the line already in the storage location when a corresponding character space in the incoming line has a blank in it.

5. The invention defined in claim 1, wherein each line of coded data includes a table select signal, and further including plural translate tables, each of which is operative to change the coded data in a line to represent selected characters in accordance with a predetermined algorithm different from predetermined algorithms of the other tables, means responsive to each line of coded data for choosing a translate table in accordance with the table select signal of the line to change the coded data of the line prior ot receipt of the line by the means for merging.

6. In a system in which lines of character coded segments are converted into lines of printed characters, each printed character corresponding to a segment in one of the lines of character coded segments, an arrangement for printing different characters in the same line in response to the same character coded segment comprising:

means for generating a first line of character coded segments having a selected character coded segment in a first location therein;

means for generating a second line of character coded segments having the selected character coded segment in a second location therein different from the first location in the first line;

means for translating each of the character coded segments of the first line into graphic coded segments in accordance with a first predetermined algorithm, the selected character coded segment being translated into a first graphic coded segment;

means for translating each of the character coded segments of the second line into graphic coded segments in accordance with a second predetermined algorithm different from the first predetermined algorithm, the selected character coded segment being translated into a second graphic coded segment different from said first graphic coded segment;

means for merging the translated first and second lines into a single line so that the first graphic coded segment occupies the first location in the single line and the second graphic coded segment occupies the second location in the single line; and means responsive to the single line for printing characters, each character corresponding to a different one of graphic coded segments in the single line and being determined by the code of the graphic coded segment, whereby the first graphic coded segment is printed as a first character in the first location in the line and the second graphic coded segment is printed as a second character different from the first character in the second location in the line.

7. The invention defined in claim 6, wherein the means for printing characters includes storage means having a plurality of different groups of character image bits stored therein, means responsive to each graphic coded segment in the single line for selecting a particular location in the storage means in accordance with the code of the graphic coded segment, and means responsive to each selection of a particular location in the storage means for using a group of character image bits stored in the particular location to print a character.

8. The invention defined in claim 7, wherein the storage means comprises a plurality of character generator module means, each of which is capable of storing the sets of character image bits for a set of characters of type style different from the type style of the other character generator module means.

9. An arrangement for printing characters in response to lines of character coded data, each line including command signals and being comprised of a plurality of segments of the character coded data, each segment representing a character to be printed, comprising:

a plurality of translate tables, each comprising storage means having a plurality of storage locations therein, each storage location being adapted to store a different segment of graphic coded data, and means responsive to a segment of character coded data received by the translate table for selecting one of the storage locations in the storage means in accordance with the character coded data;

means responsive to each line of character coded data for selecting one of the plurality of translate tables to receive the segments of character coded data of the line in accordance with the command signal included with the line;

line storage means;

means responsive to selection of the storage locations in the storage means of the plurality of translate tables for storing the segments of graphic coded data in the line storage means in the order selected to form a line;

character generator module means having a plurality of storage locations, each storage location being adapted to store different sets of character image data;

means responsive to each segment of graphic coded data in the line storage means for selecting a storage location in the character generator module means in accordance with the graphic coded data; and means responsive to selection of the storage locations in the character generator module means for using the sets of character image data stored in the storage locations to print characters, the character image data of each set defining a particular character to be printed.

10. The invention defined in claim 9, wherein the line storage means includes plural storage locations, each adapted to store a line of graphic coded data, and the means for storing the segments of graphic data in the line storage means includes means responsive to each line of character coded data received by one of the plurality of translate tables for selecting one of the plural storage locations of the line storage means for assembly of the segments of graphic coded data into a line, the means for selecting one of the plurality of translate tables selecting either the same storage location selected for the preceding line of character coded data or a different storage location in accordance with the command signals, and means for merging the segments of graphic coded data of each line being assembled in a storage location in the line storage means with any segments of graphic coded data previously assembled into a line in the storage location in accordance with a predetermined algorithm.

11. An arrangement for printing characters in response to a plurality of different groups of data, the groups of the data being of like size and occurring successively, comprising:

data storage means;

means responsive to the data for temporarily storing an initial group of data in a selected location in the data storage means;

means responsive to at least one group of data occurring subsequent to the initial group of data for combining the subsequent group of data with the initial group of data to form a new group of data in the selected location in the data storage means;

said means for combining including means for comparing the subsequent group of data with the initial group of data and means responsive to the means for comparing for replacing selected portions of the initial group of data with the corresponding portions of the subsequent group of data to form the new group of data; and means responsive to the new group of data for printing characters represented by the new group of data.

12. The invention defined in claim 11, wherein each of the groups of data includes command data identifying space functions, the data storage means has a plurality of storage locations including the selected storage location, each storage location being capable of storing a group of data, and the means for temporarily storing and the means for combining together comprise means responsive to each group of data for entering the group of data in the selected storage location or in a storage location different from the selected storage location depending upon the command data, and means responsive to each entering of a group of data in the selected storage location for merging the group of data into any group of data already stored in the selected storage location in accordance with a predetermined algorithm of priorities to form a combined group of data.

13. The invention defined in claim 1, wherein the means for combining is operative to combine the subsequent group of data with the initial group of data in accordance with an algorithm which determines which of the initial group of data and the subsequent group of data is to be used to provide various portions of the new group of data.

14. The invention defined in claim 13, wherein each of the groups of data comprises a plurality of characters defining one line within a page, and the means for combining selects each character of the new group of data from either the initial group of data or the subsequent group of data in accordance with the algorithm.

15. The invention defined in claim 13, wherein each of the groups of data comprises a succession of spaces, each containing either a character or a blank, and the means for combining selects the contents of each of the succession of spaces comprising the new group of data from either the initial group of data or the subsequent group of data in accordance with the algorithm, the algorithm causing selection of a blank when the initial group of data and the subsequent group of data each contain a blank, selection of a character when the character is contained within either of the initial and subsequent groups of data with the other groups containing a blank, and selection of a character in the initial group of data when both the initial and subsequent groups of data contain characters.

16. An arrangement for printing characters in response to input channel commands and a plurality of different groups of input character coded data, the groups of data being of like size and occurring successively, comprising:

plural translate means, each having a plurality of storage locations with items of graphic coded data stored therein which are different from the items of graphic coded data stored in the corresponding storage locations in the other translate means, and, being responsive to receipt of a group of input character coded data, for translating the character coded data into graphic coded data by selecting storage locations therein in accordance with the values of the character coded data, and assembling the resulting items of graphic coded data from the selected storage locations as the graphic coded data to be printed;

means responsive to each input channel command for selecting one of the translate means to receive each group of input character coded data; and means responsive to the graphic coded data generated by said selected translate means for printing characters represented thereby.

17. The invention defined in claim 16, wherein the means for printing characters includes plural character generator means, each storing different segments of character image data, each segment of character image data being used by the means for printing when selected to print a predetermined character, and means responsive to each group of character coded data as translated into graphic coded data for selecting character generator means and segments of character image data therein identified by the graphic coded data.

18. The invention defined in claim 17, wherein each group of character coded data represents a line of characters, and further including means for merging together selected groups of character coded data as translated by the plural translate means to form a line of graphic coded data.

19. The invention defined in claim 18, wherein the means for merging includes storage means having a plurality of different storage locations therein, means for storing each group of character coded data as translated by the plural translate means in a selected storage location in the storage means and means for merging each translated group of character coded data with any translated group of data previously stored in the selected storage location in which the translated group of character coded data is being stored.

* * * * *

UNITED STATES PATENT AND TRADEMARK OFFICE
CERTIFICATE OF CORRECTION

PATENT NO. : 4,005,390
DATED : January 25, 1977
INVENTOR(S) : Gerald I. Findley

It is certified that error appears in the above-identified patent and that said Letters Patent are hereby corrected as shown below:

Column 11, line 10, after "command" and before "from", insert --different--; line 59, after "prior" and before "receipt", "ot" should read --to--.
Column 14, line 17, after "claim", "1" should read --11--.

Signed and Sealed this

Twelfth Day of April 1977

[SEAL]

Attest:

RUTH C. MASON
Attesting Officer

C. MARSHALL DANN
Commissioner of Patents and Trademarks